(12) United States Patent
Niga

(10) Patent No.: US 10,812,728 B2
(45) Date of Patent: Oct. 20, 2020

(54) CONTROL APPARATUS, CONTROL METHOD, AND RECORDING MEDIUM

(71) Applicant: CANON KABUSHIKI KAISHA, Tokyo (JP)

(72) Inventor: Shota Niga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/402,083

(22) Filed: May 2, 2019

(65) Prior Publication Data
US 2019/0349532 A1 Nov. 14, 2019

(30) Foreign Application Priority Data
May 11, 2018 (JP) ................... 2018-092405

(51) Int. Cl.
*H04N 5/232* (2006.01)

(52) U.S. Cl.
CPC ..... *H04N 5/23299* (2018.08); *H04N 5/23212* (2013.01); *H04N 5/23216* (2013.01); *H04N 5/23222* (2013.01)

(58) Field of Classification Search
CPC .......... H04N 5/23216; H04N 5/23293; H04N 5/23296; H04N 7/183; H04N 5/23299; H04N 5/23212; H04N 5/23222
See application file for complete search history.

(56) References Cited

U.S. PATENT DOCUMENTS

| | | | |
|---|---|---|---|
| 6,697,105 B1 | 2/2004 | Kato | |
| 8,654,199 B2* | 2/2014 | Oya | G08B 13/19602 348/208.1 |
| 10,094,764 B2* | 10/2018 | Winkelman | G01N 1/2813 |
| 10,107,624 B2* | 10/2018 | Hinderling | G01C 3/08 |
| 10,200,577 B2* | 2/2019 | Okada | G21C 17/00 |
| 10,356,330 B1* | 7/2019 | Morton | H04N 5/2253 |
| 2001/0019355 A1* | 9/2001 | Koyanagi | H04N 5/232 348/36 |
| 2003/0163826 A1* | 8/2003 | Weinstein | G08B 13/19656 725/105 |
| 2004/0017470 A1* | 1/2004 | Hama | G08B 13/19626 348/42 |
| 2006/0203090 A1* | 9/2006 | Wang | G06K 9/209 348/143 |
| 2008/0111891 A1* | 5/2008 | Kurita | H04N 5/2259 348/211.99 |
| 2008/0239102 A1* | 10/2008 | Okada | H04N 5/232 348/240.99 |
| 2011/0199487 A1* | 8/2011 | Husoy | G05B 19/418 348/159 |

(Continued)

FOREIGN PATENT DOCUMENTS

| | | |
|---|---|---|
| JP | 200013665 A | 1/2000 |
| JP | 2017173802 A | 9/2017 |
| WO | 2016/171797 A1 | 10/2016 |

*Primary Examiner* — Chiawei Chen

(74) *Attorney, Agent, or Firm* — Canon U.S.A., Inc. IP Division

(57) ABSTRACT

A control apparatus for an image pickup apparatus including a drive unit configured to drive a tilting of an image pickup element includes a field angle setting unit configured to set a field angle, a focus setting unit configured to set a focus after the field angle is set, and a tilt angle setting unit configured to set a tilt angle in accordance with a user operation after the field angle and the focus are set.

10 Claims, 12 Drawing Sheets

(56) References Cited

U.S. PATENT DOCUMENTS

| | | | |
|---|---|---|---|
| 2012/0249866 A1* | 10/2012 | Alm | H04N 5/2251 |
| | | | 348/373 |
| 2013/0230293 A1* | 9/2013 | Boyle | H04N 5/23219 |
| | | | 386/224 |
| 2014/0101700 A1* | 4/2014 | Sheeley | H04N 5/222 |
| | | | 725/41 |
| 2015/0356715 A1* | 12/2015 | Nakata | G06F 1/1624 |
| | | | 715/719 |
| 2016/0094780 A1* | 3/2016 | Monkiewicz | G03B 13/36 |
| | | | 348/164 |
| 2017/0003860 A1 | 1/2017 | Kozakura | |
| 2017/0339329 A1* | 11/2017 | Lee | H04N 5/23206 |
| 2017/0339336 A1* | 11/2017 | Daliyot | G06F 3/0482 |

\* cited by examiner

CONTROL APPARATUS, CONTROL METHOD, AND RECORDING MEDIUM

BACKGROUND OF THE INVENTION

Field of the Invention

The present invention relates to a control apparatus for an image pickup apparatus including a drive unit configured to drive tilting of an image pickup element, a control method, and a recording medium.

Description of the Related Art

Hitherto, there have been cases in which a monitoring camera is installed at a high place, and an optical axis of the camera is directed obliquely downward, to thereby monitor people passing on a road, and pick up an image of a vehicle and a license plate thereof. Typically, the focal plane at which the camera focuses for image pickup lies on a plane perpendicular to its optical axis. However, in cases where a camera installed at a high place tries to pick up an image of a lower down object (e.g. an object on the road), the optical axis of the camera is directed obliquely downward, and hence its focal plane may not match the actual image pickup plane of the object to be subjected to the image pickup. Therefore, only part of the object may be in focus. Thus, only a part of a screen showing the picked-up image may be in focus, whilst the rest of the object on the screen is out of focus. To address this problem, there is a method of closing a diaphragm of an optical system to increase the depth of field, to thereby prevent the defocusing. However, to pick up an image at low illuminance, monitoring cameras require the diaphragm to be fully or almost fully opened. However, opening a diaphragm to such an extent causes the depth of field to decrease, and consequently the entire screen may become out of focus, and the image is thus picked up under a state of being out of focus. To address this problem, there is a method of using, for example, a TS lens (tilt-shift lens) to incline the lens relative to the image pickup element in the camera, to thereby increase the range of the depth of field. Meanwhile, there is a technology of inclining the image pickup element relative to the lens, to thereby increase the range of the depth of field.

In Japanese Patent Application Laid-Open No. 2017-173802, there is disclosed a technology of using a mechanism capable of inclining an image pickup element with respect to an 'optical-axis orthogonal plane' which lies orthogonal to an optical axis of an image pickup optical system and a plurality of focus detection areas, and inclining an image pickup element based on out-of-focus amounts detected from the plurality of focus detection areas. Moreover, in Japanese Patent Application Laid-Open No. 2000-13665, there is disclosed a technology of using a mechanism configured to freely incline an image pickup element to detect a tilt angle and a tilt direction, to thereby control the tilt angle and the tilt direction of the image pickup element based on the detected pieces of information.

When, for example, a zoom value of an image pickup apparatus (e.g. camera) employing the technology of adjusting the tilt angle of the image pickup element is changed after setting the tilt angle off the image pickup element, a zoom lens moves, and thus the relative position between the zoom lens and the image pickup element changes. The focus position accordingly changes, and the tilt angle is thus required to be adjusted again.

SUMMARY OF THE INVENTION

Thus, according to one embodiment of the present invention, there is provided a control apparatus for an image pickup apparatus including a drive unit configured to drive a tilting of an image pickup element, the control apparatus including: a field angle setting unit configured to set a field angle; a focus setting unit configured to set a focus after the field angle is set; and a tilt angle setting unit configured to set a tilt angle in accordance with a user operation after the field angle and the focus are set.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
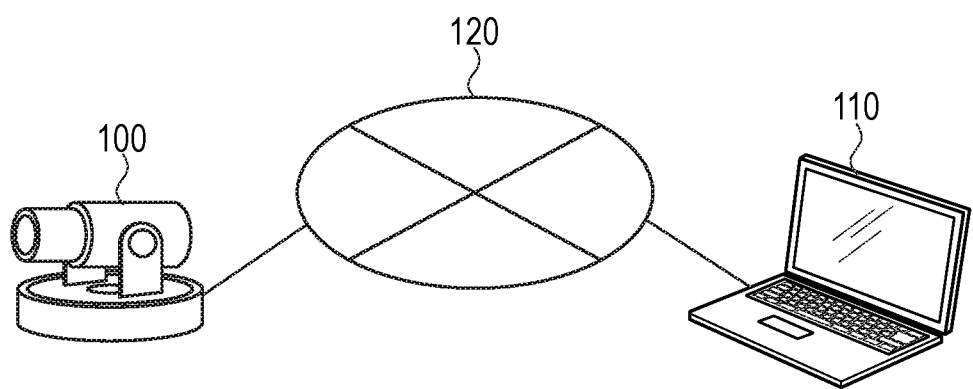
FIG. 1 is an overall view for illustrating a monitoring system in a first embodiment of the present invention.

FIG. 1 is an overall view for illustrating a monitoring system in a first embodiment of the present invention. A monitoring camera 100 and a control apparatus 110 are connected to each other through a network 120 in a manner that allows mutual communication therebetween. The control apparatus 110 is configured to transmit various commands to the monitoring camera 100. The monitoring camera 100 is configured to transmit responses corresponding to those commands to the control apparatus 110. A zoom and a focus of the monitoring camera 100 can be adjusted.

Figure 2:
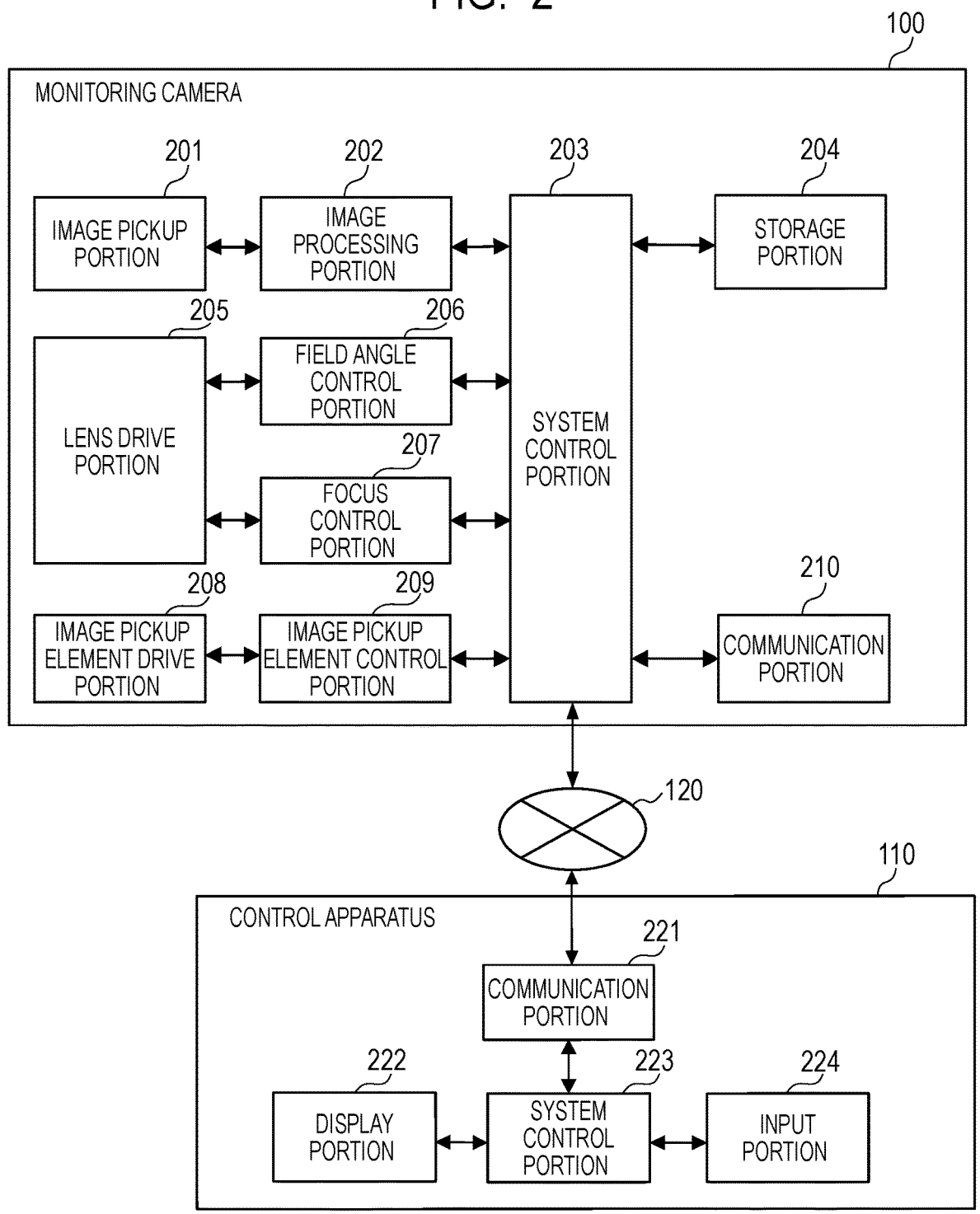
FIG. 2 is a hardware configuration diagram for illustrating the monitoring system.

FIG. 2 is a hardware configuration diagram for illustrating the monitoring system. The monitoring camera 100 includes an image pickup portion 201, an image processing portion 202, a system control portion 203, and a storage portion 204. The monitoring camera 100 further includes a lens drive portion 205, a field angle control portion 206, a focus control portion 207, an image pickup element drive portion 208, an image pickup element control portion 209, and a communication portion 210.

The image pickup portion 201 includes a lens and an image pickup element, and is configured to pick up an image of an object, and convert the image into an electric signal. The image pickup element may be a CMOS image sensor, CCD image sensor or other type of image sensor. The image processing portion 202 is configured to execute predetermined image processing and compression coding processing for the signal of the image, which is picked up and is photoelectrically converted in the image pickup portion 201, to thereby generate image data.

The system control portion 203 is configured to control the entire control apparatus 110. The system control portion 203 analyzes a camera control command transmitted from the control apparatus 110, and executes processing corresponding to the command. The system control portion 203 receives, for example, a request command for a live image from the control apparatus 110, and distributes the image data generated by the image processing portion 202 through the communication portion 210.

Moreover, the system control portion 203 receives request commands for setting values of the zoom, the focus, and tilt angles of the monitoring camera 100, and distributes, through the communication portion 210, set values for the field angle control portion 206, the focus control portion 207, and the image pickup element control portion 209 in accordance with the respective request commands. Moreover, when the system control portion 203 receives a setting command from the control apparatus 110, the system control portion 203 instructs a control portion (e.g. the field angle control portion 206, the focus control portion 207, and/or the image pickup element control portion 209) corresponding to the setting command to execute control based on the set value. As a result, the set values relating to the zoom, the focus, and/or the tilt angle set by the control apparatus 110 are reflected in the monitoring camera 100.

The storage portion 204 is configured to record images into an internal storage and/or an external storage. Functions and processing of the monitoring camera 100 described later are implemented by the system control portion 203 reading out programs stored in the storage portion 204, and executing the programs.

The field angle control portion 206 is configured to instruct the lens drive portion 205 to change a zoom lens position based on the set value of the zoom transmitted from the system control portion 203. The focus control portion 207 is configured to instruct the lens drive portion 205 to change a focus lens position based on the set value of the focus transmitted from the system control portion 203. The image pickup element control portion 209 is configured to instruct the image pickup element drive portion 208 to change image pickup element tilt angles based on the set values of the tilt angles transmitted from the system control portion 203.

The communication portion 210 is configured to distribute the image data to the control apparatus 110 through the network 120. Moreover, the communication portion 210 receives various commands transmitted from the control apparatus 110, and transmits the commands to the system control portion 203. The commands transmitted from the control apparatus 110 mainly include the request command for the live image, the request commands for the set values of the zoom, the focus, and the tilt angles of the monitoring camera 100, and the setting commands for the zoom, the focus, and the tilt angles of the monitoring camera 100.

The control apparatus 110 includes a communication portion 221, a display portion 222, a system control portion 223, and an input portion 224. The communication portion 221 is configured to receive various types of data distributed from the monitoring camera 100 and transmit various types of commands issued from the control apparatus 110. The various types of data mainly includes, for example, information on the image pickup field angle including the zoom, information on the focus, and information on the tilting of the monitoring camera 100, and the image data. The display portion 222 is, for example, a liquid crystal display apparatus. The display portion 222 is configured to display images acquired from the monitoring camera and GUIs to be used to control the camera.

The system control portion 223 is configured to generate a camera control command in accordance with a GUI operation by a user, and transmit the camera control command to the monitoring camera 100 through the communication portion 221. Moreover, the system control portion 223 displays on the display portion 222 the image data received from the monitoring camera 100 through the communication portion 221 and data indicating the set values of the image pickup field angle including the zoom, the focus, and the tilt angles. A keyboard and a pointing device, for example, a mouse, are used for the input portion 224. The user of a client apparatus operates the GUI through the input portion 224.

Figure 3:
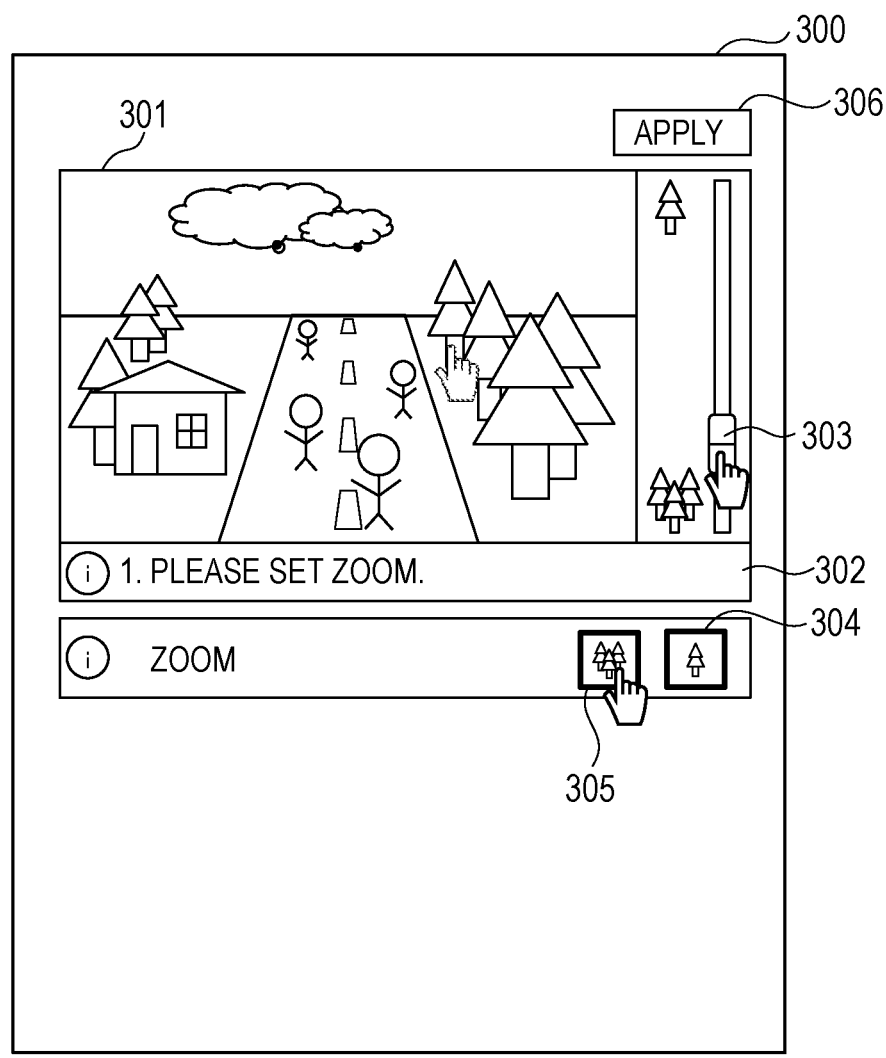
FIG. 3 is a view for illustrating an example of a zoom setting screen.

FIG. 3 is a view for illustrating an example of a zoom setting screen 300. The zoom setting screen 300 is a GUI displayed on the display portion 222 of the control apparatus 110. The user operation on the zoom setting screen 300 is performed through the input portion 224. An image display region 301 displays an image. A text display region 302 displays text. A zoom control slider bar 303 is used to control the zoom. A zoom-in button 304 is used to zoom-in to display a zoomed-in image. A zoom-out button 305 is used to zoom-out to display a zoomed-out image. An "apply" button 306 is used to finish the setting for the zoom to proceed to a setting screen for the focus. The control apparatus 110 receives zoom information from the monitoring camera 100, and expresses the zoom information on the zoom setting screen 300. Herein, the zoom information is information on the zoom, and contains the set value of the zoom. The zoom information is expressed on the zoom setting screen 300 in various forms through use of numerical values, text, and the slider bar, for example.

The live image distributed from the monitoring camera 100 is displayed in the image display region 301. In the text display region 302, information for instructing the user to set the zoom and information on the image pickup field angle containing a current set value of the zoom are displayed. Descriptions of the various buttons and the slider bar on the zoom setting screen 300 are also displayed in the text display region 302.

The user can control the zoom of the monitoring camera 100 through the slider bar 303 and the buttons 304 and 305. When the user operates any one of the slider bar 303 and the buttons 304 and 305, the control apparatus 110 transmits the setting command for the zoom to the monitoring camera 100 through the network 120. When the user moves the bar toward an upward direction on the zoom control slider bar 303, or presses the zoom-in button 304, the monitoring camera 100 picks up an image zoomed in from the image pickup field angle displayed on the image display region 301 of the control apparatus 110. Meanwhile, when the user moves the zoom control slider bar 303 toward a downward direction, or presses the zoom-out button 305, the monitoring camera 100 picks up an image zoomed out from the image pickup field angle displayed on the image display region 301 of the control apparatus 110.

The control apparatus 110 receives from the monitoring camera 100 a live image obtained after the image pickup field angle is changed through the zoom, and displays the live image on the image display region 301. When the user presses the "apply" button 306, the display on the display portion 222 is switched from the zoom setting screen 300 to a focus setting screen 400 illustrated in FIG. 4. Various methods such as a mouse wheel type and a text box type as well as the button type and the slider bar type illustrated in FIG. 3 are conceivable as the method of setting the zoom. When the monitoring camera 100 includes a pan drive mechanism, a tilt drive mechanism, and a roll drive mechanism for a lens barrel portion, setting interfaces for those mechanisms may be displayed on the zoom setting screen 300.

Figure 4:
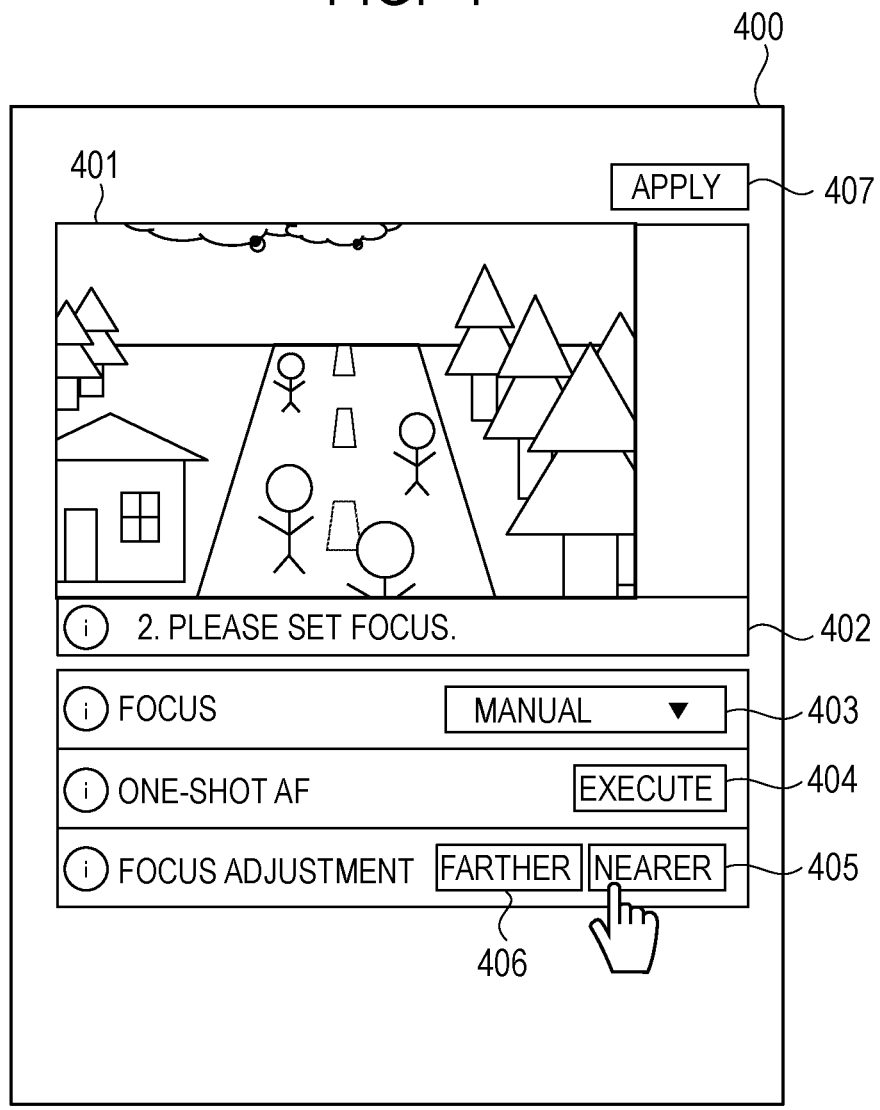
FIG. 4 is a view for illustrating a display example of a focus setting screen.

FIG. 4 is a view for illustrating a display example of the focus setting screen 400 displayed on the display portion 222 of the control apparatus 110. An image display region 401 displays an image. A text display region 402 displays text. A display field 403 displays a focus mode. An "execute" button 404 is used to execute one-shot automatic focus (hereinafter referred to as AF) of automatically focusing only once. A nearer adjustment button 405 is used to adjust the focus to a nearer point. A farther adjustment button 406 is used to adjust the focus to a farther point. An "apply" button 407 is used to finish the setting for the focus to proceed to a setting screen for the tilt angles. The control apparatus 110 receives set values relating to the focus from the monitoring camera 100, and displays the set values on the focus setting screen 400.

In this case, a manual focus mode, an automatic focus mode, a fixed infinity focus mode, and other such modes are conceivable as the focus modes of the monitoring camera 100. The manual focus mode is a mode in which the user manually adjusts the lens position of the focus lens. The automatic focus mode is a mode in which the lens position of the focus lens is always continuously adjusted automatically so that, for example, a center region of the image pickup field angle is focused by the monitoring camera 100. The fixed infinity focus mode is a mode in which the monitoring camera 100 moves the focus lens to a lens position which is recorded in the focus lens and at which the infinity can be brought into focus. This mode is a mode for picking up an image of far scenery and a far object. An object appearing in the vicinity cannot be focused in the fixed infinity focus mode. Moreover, the one-shot AF is a function of causing the monitoring camera 100 to carry out the AF only once for the image pickup field angle under the state in which the focus mode is the manual focus mode, and then returning the focus mode to the manual focus mode.

The live image distributed from the monitoring camera 100 is displayed in the image display region 401. Information for instructing the user to set the focus, information on the set values of the focus, descriptions of the various buttons on the focus setting screen 400, and other such information are displayed in the text display region 402. In the exemplary illustration of FIG. 4, the focus mode is fixed to the manual focus mode in the tilt setting, and thus only the manual focus mode is displayed as the focus mode in the display field 403 for the focus mode.

The user can press the "execute" button 404 for the one-shot AF to execute the AF only once, to thereby be able to bring the center region of the image pickup field angle of the monitoring camera 100 into focus. Moreover, when the user presses the nearer adjustment button 405, the focus can be adjusted nearer with respect to the image pickup field angle of the monitoring camera 100. Meanwhile, when the user presses the farther adjustment button 406, the focus can be adjusted farther with respect to the image pickup field angle. When the user operates any one of the buttons 405 and 406, the control apparatus 110 transmits the setting command for the focus to the monitoring camera 100 through the network 120. When the user presses the "apply" button 407, the display portion 222 of the control apparatus 110 switches the GUI from the focus setting screen to a tilt angle setting screen.

Figure 5:
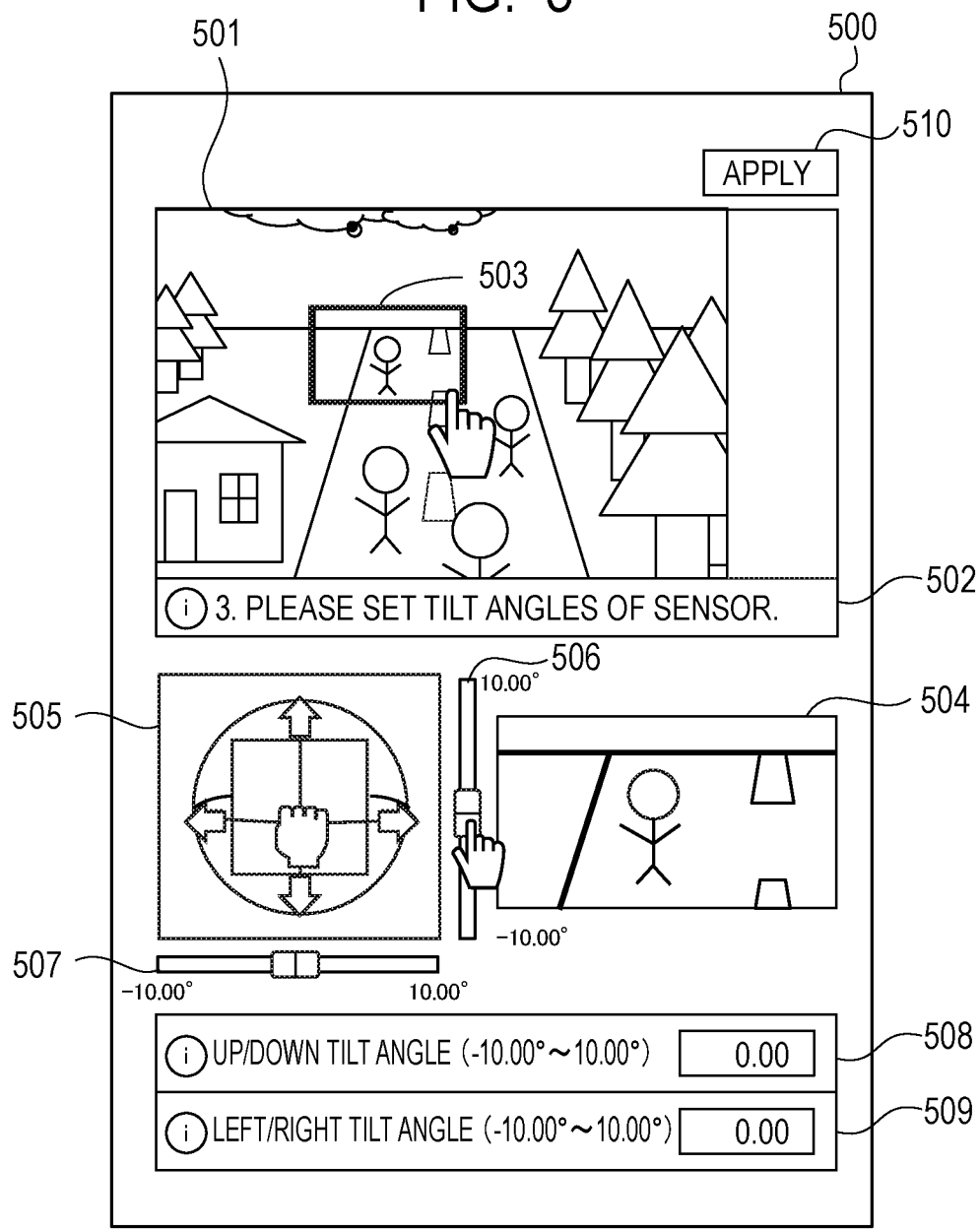
FIG. 5 is a view for illustrating a display example of a tilt angle setting screen.

FIG. 5 is a view for illustrating a display example of a tilt angle setting screen 500 displayed on the display portion 222 of the control apparatus 110. An image display region 501 displays an image. A text display region 502 displays text. A specification frame 503 is used to specify a region to be extracted. When the specification frame 503 is set to a desired position through a user operation, the system control portion 223 receives a specification for a partial region contained in the specification frame 503. Then, the system control portion 223 displays the partial region in an enlarged manner in an enlarged display region 504. The processing of receiving the specification for the partial region is an example of region reception processing. A tilt control interface 505 is used to control the tilt of the image pickup element. An up/down tilt control slider bar 506 is used to control an up/down tilt of the image pickup element. A left/right tilt control slider bar 507 is used to control a left/right tilt of the image pickup element. A display field 508 displays an up/down tilt angle of the image pickup element. A display field 509 displays a left/right tilt angle for the image pickup element. An "apply" button 510 is used to finish the setting of the tilt.

On the tilt angle setting screen 500, the control apparatus 110 does not accept a user operation to change camera parameter set values which may affect the tilt angle adjustment. The control apparatus 110 receives the information relating to the tilt from the monitoring camera 100, and expresses the information on the tilt angle setting screen 500.

The live image distributed from the monitoring camera 100 is displayed in the image display region 501. In the text display region 502, information for instructing the user to set the tilt angles, information on the tilt including set values of the tilt angles and tilt directions available for the setting, descriptions of the control interface and the image displayed on the tilt angle setting screen 500, and other such information are displayed.

A function of extracting and enlarging the image displayed on the image display region 501 is provided for the tilt angle setting screen 500 so that the user can confirm that an object appearing at a far position in a small size is focused. The user can set at least one specification frame 503 for extracting a respective image on the image display region 501. An extracted image in a specified region is displayed in an enlarged manner in the enlarged display region 504. The processing for extracting the image may be executed by the monitoring camera 100 or the control apparatus 110.

As rotation axes for the tilt of the image pickup element, various rotation axes are conceivable. Those rotation axes include an axis for an up/down tilt and an axis for a left/right tilt. The up/down tilt rotates the image pickup element about an axis horizontal with respect to an image pickup direction of the monitoring camera 100. The left/right tilt rotates the image pickup element about an axis vertical with respect to the image pickup direction of the monitoring camera 100. As an example, in the tilt control interface 505, the user drags a three-dimensional model of the image pickup element displayed in the interface 505 to rotate the model in the up/down direction and in the left/right direction while checking at least one of the image display region 501 and the enlarged display region 504. As a result, the up/down tilt angle and the left/right tilt angle of the image pickup element of the monitoring camera 100 can be set. Moreover, axes of the tilt and directions of the tilt that can be controlled for the image pickup element of the monitoring camera 100 are also displayed on the tilt control interface 505. In addition, on the up/down tilt control slider bar 506 and the left/right tilt control slider bar 507, the user slides the bars indicating the tilt angles, to thereby be able to adjust the up/down tilt angle and the left/right tilt angle of the image pickup element. Moreover, effective ranges of the up/down tilt angle and the left/right tilt angle are also displayed at both ends of the slider bars 506 and 507.

When the user operates the interface 505 and the slider bars 506 and 507, the control apparatus 110 transmits the setting command for the tilt angles to the monitoring camera 100 through the network 120. The transmitted setting command for the tilt angles contains tilt information such as the tilt axes, the tilt directions, and the set tilt angles. The tilt control interface 505, the up/down tilt control slider bar 506, and the left/right tilt control slider bar 507 are examples of a user interface image. The display field 508 for the up/down tilt angle and the display field 509 for the left/right tilt angle display the effective range and the set value of the up/down swing angle and the effective range and the set value of the left/right tilt angle, respectively, out of the tilt information on the image pickup element received from the monitoring camera 100. When the user presses the "apply" button 510, the control apparatus 110 finishes the setting for the tilting.

Figure 6:
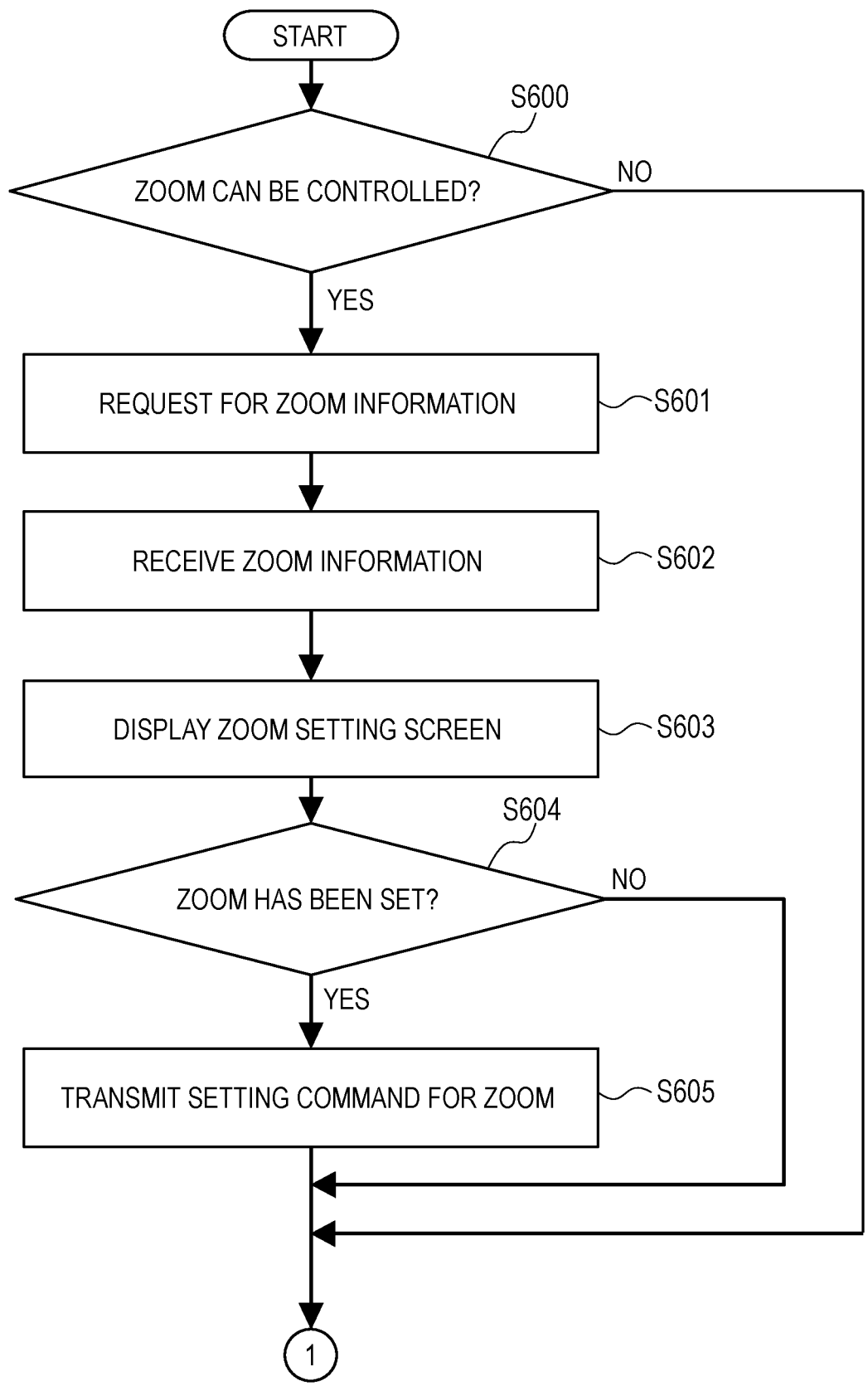
FIG. 6 is a flowchart for illustrating setting processing.
Figure 7:
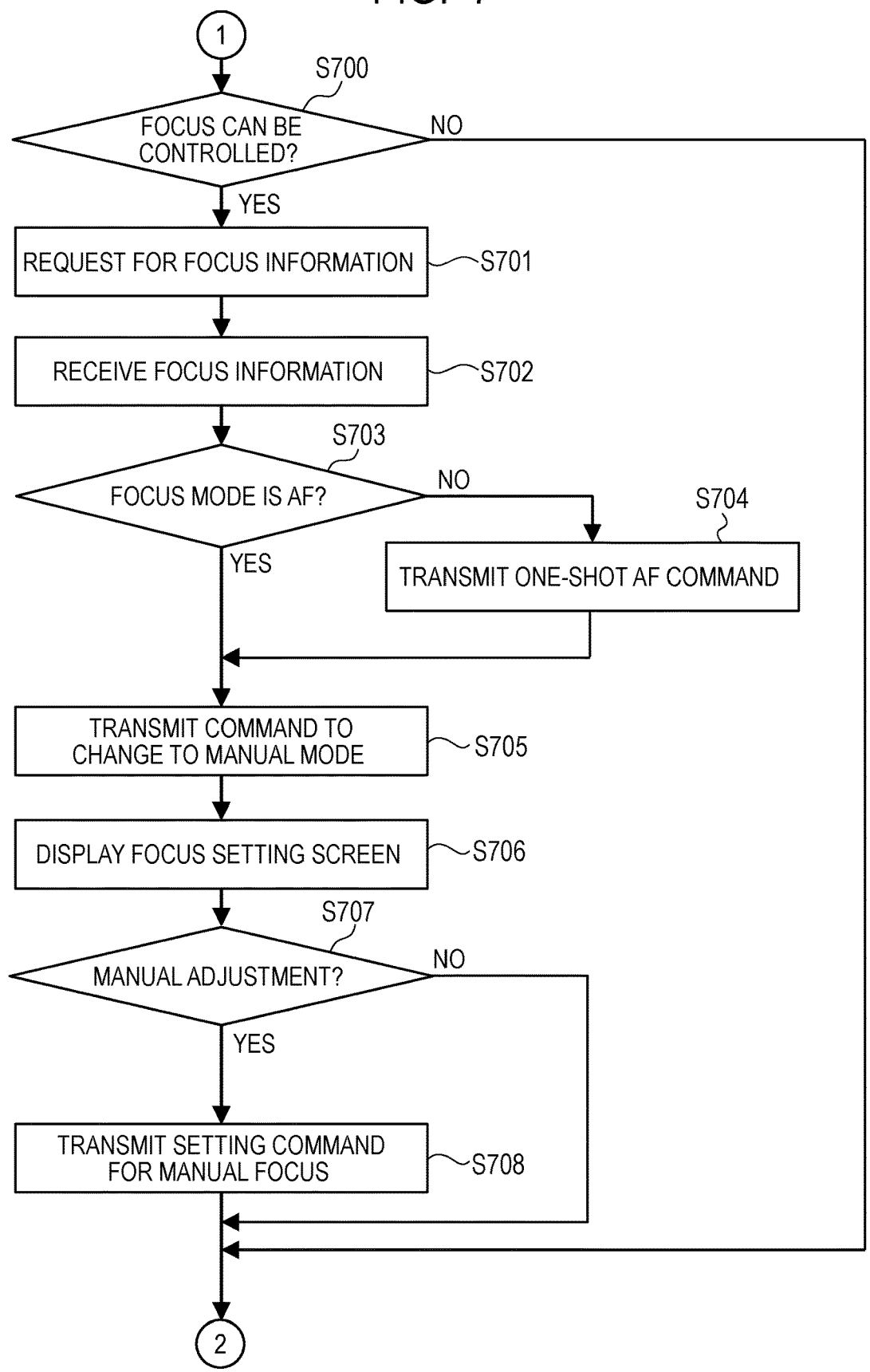
FIG. 7 is a flowchart for illustrating the setting processing.
Figure 8:
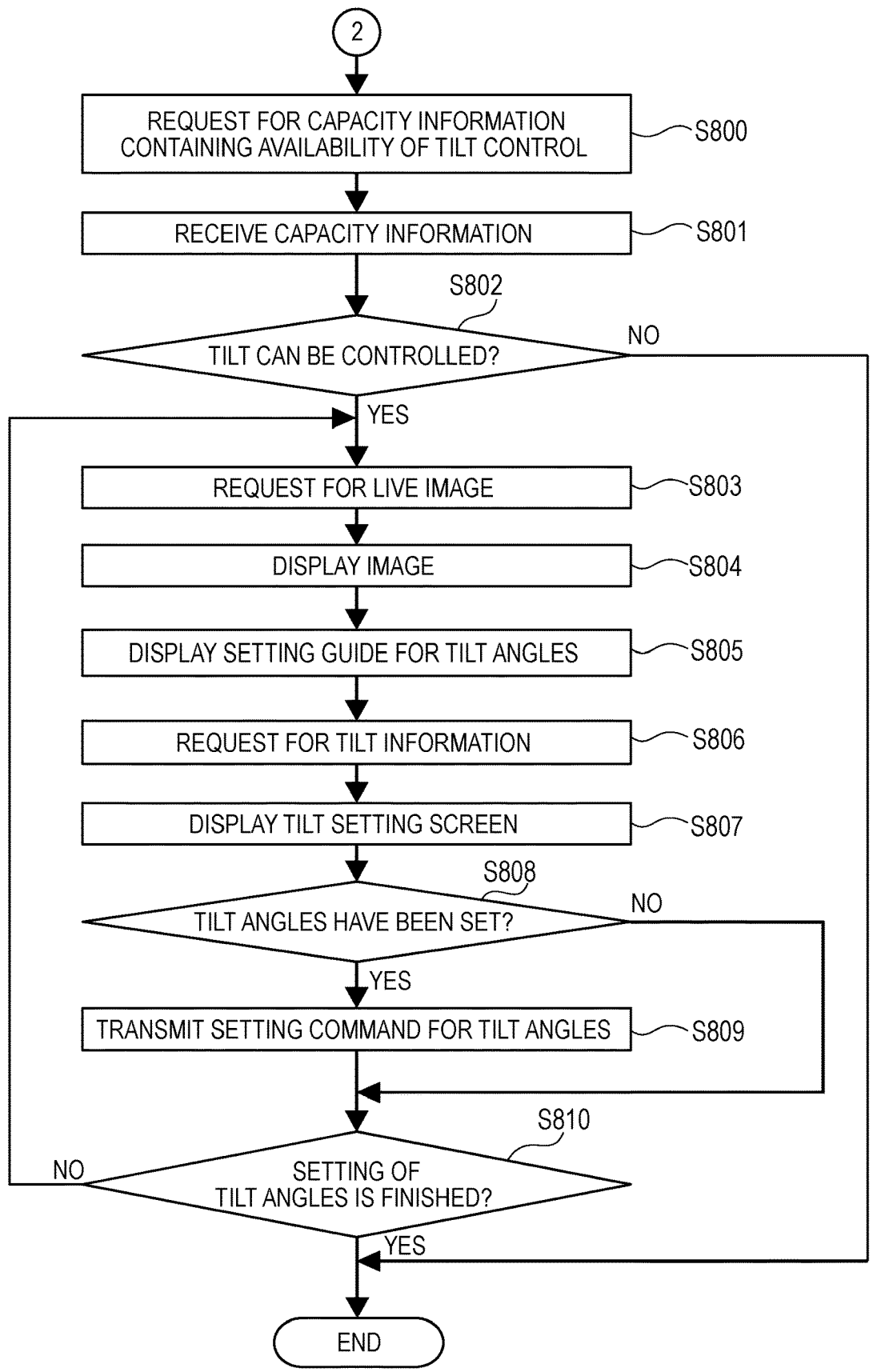
FIG. 8 is a flowchart for illustrating the setting processing.

FIG. 6 to FIG. 8 are flowcharts for illustrating setting processing by the control apparatus 110. In Step S600 illustrated in FIG. 6, the system control portion 223 determines, based on capacity information acquired in advance from the monitoring camera 100, whether or not the monitoring camera 100 includes a zoom control mechanism and, if it does, whether or not the zoom can be controlled from the control apparatus 110. When the zoom can be controlled (YES in Step S600), the system control portion 223 advances the processing to Step S601. When the zoom cannot be controlled (NO in Step S600), the system control portion 223 advances the processing to Step S700 (FIG. 7).

In Step S601, the system control portion 223 requests for the zoom information on the monitoring camera 100 from the monitoring camera 100. Then, in Step S602, the system control portion 223 receives the zoom information on the monitoring camera 100 from the monitoring camera 100. Then, in Step S603, the system control portion 223 displays on the display portion 222 the zoom setting screen 300 together with the received zoom information.

Then, in Step S604, the system control portion 223 determines whether or not the zoom has been set in accordance with the user operation. When the user sets the zoom on the zoom setting screen 300, the system control portion 223 receives a setting instruction for the zoom. Then, the system control portion 223 sets the zoom in accordance with the setting instruction. This processing is an example of field angle setting processing of setting the zoom in accordance with the input operation on the display screen. When the user positions a mouse cursor on the zoom control slider bar 303, and moves the bar while holding a mouse button, the system control portion 223 executes the zoom setting in accordance with the user operation. Moreover, the user may position the mouse cursor on any one of the zoom-in button 304 and the zoom-out button 305 to click the mouse button, to thereby execute the zoom operation. When the zoom has been set (YES in Step S604), the system control portion 223 advances the processing to Step S605. When the zoom has not been set (NO in Step S604), the system control portion 223 advances the processing to Step S700.

In Step S605, the system control portion 223 transmits the setting command for the zoom to the monitoring camera 100. The setting command for the zoom is transmitted when the user releases the mouse button on any one of the zoom control slider bar 303, the zoom-in button 304, and the zoom-out button 305 on the zoom setting screen 300. The system control portion 223 transmits to the monitoring camera 100 the specified set value of the zoom together with the setting command for the zoom. The zoom setting has now been finished.

Then, in Step S700 illustrated in FIG. 7, the system control portion 223 determines, based on the capacity information acquired in advance from the monitoring camera 100, whether or not the monitoring camera 100 includes a focus control mechanism and, if it does, whether or not the focus can be controlled from the control apparatus 110. When the focus can be controlled (YES in Step S700), the system control portion 223 advances the processing to Step S701. When the focus cannot be controlled (NO in Step S700), the system control portion 223 advances the processing to Step S800 (FIG. 8).

In Step S701, the system control portion 223 requests for focus information on the monitoring camera 100 from the monitoring camera 100. The focus information is information on the focus, and contains the setting of the focus. Then, in Step S702, the system control portion 223 receives the information on the focus of the monitoring camera 100 from the monitoring camera 100. Then, in Step S703, the system control portion 223 determines whether or not the focus mode of the monitoring camera 100 is the AF mode. When the focus mode is the AF mode (YES in Step S703), the system control portion 223 advances the processing to Step S705. When the focus mode is not the AF mode (NO in Step S703), the system control portion 223 advances the processing to Step S704.

When the focus mode is other than the AF mode, the center region of the image pickup field angle may not be in focus. Therefore, in Step S704, the system control portion 223 transmits a command to execute the one-shot AF to the monitoring camera 100 so that the center region of the image pickup field angle is brought into focus. Then, in Step S705, the system control portion 223 transmits to the monitoring camera 100 a command to change the focus mode to the manual focus mode. Then, the system control portion 223 displays "Manual" as the focus mode in the display field 403 for the focus mode. Then, in Step S706, the system control portion 223 displays on the display portion 222 the focus setting screen 400 together with the received information on the focus.

Then, in Step S707, the system control portion 223 determines whether or not the focus has been set in accordance with the manual operation by the user. The system control portion 223 receives an instruction to set the focus when the user presses the nearer adjustment button 405 for the focus or the farther adjustment button 406 for the focus to manually adjust the focus. Then, the system control portion 223 sets the focus in accordance with the setting instruction. This processing is an example of focus setting processing. When the focus has been set (YES in Step S707), the system control portion 223 advances the processing to Step S708. When the focus has not been set (NO in Step S707), the system control portion 223 advances the processing to Step S800 (FIG. 8). In Step S708, the system control portion 223 transmits the setting command for the manual focus to the monitoring camera 100. The focus setting has now been finished.

Then, in Step S800 illustrated in FIG. 8, the system control portion requests for the capacity information on the monitoring camera 100 from the monitoring camera 100. The capacity information includes information on whether or not the monitoring camera 100 includes a tilt control mechanism for the image pickup element and whether or not the tilt angles can be controlled from the control apparatus 110. In Step S801, the system control portion 223 receives the capacity information from the monitoring camera 100. In Step S802, the system control portion 223 determines whether or not the monitoring camera 100 includes the tilt control mechanism for the image pickup element and whether or not the tilt angles can be controlled from the control apparatus 110. When the tilt angles can be controlled (YES in Step S802), the system control portion 223 advances the processing to Step S803. When the tilt angles cannot be controlled (NO in Step S802), the system control portion 223 ends the setting processing.

In Step S803, the system control portion 223 requests for the live image from the monitoring camera 100. Then, in Step S804, the system control portion 223 displays the tilt angle setting screen 500 on the display portion 222, and displays the live image received from the monitoring camera 100 in the image display region 501 on the tilt angle setting screen 500. Then, in Step S805, the system control portion 223 displays text serving as guidelines to be used until the tilt angles are set in the text display region 502 on the tilt angle setting screen 500.

Then, in Step S806, the system control portion 223 requests for the tilt information on the image pickup element of the monitoring camera 100 from the monitoring camera 100. The tilt information is information on the tilt, and contains the axes for the tilt and the tilt directions that can be controlled, the current values of the tilt angles, and the effective ranges of the tilt angles. Then, in Step S807, the system control portion 223 receives information on the tilt of the image pickup element from the monitoring camera 100. Then, the system control portion 223 displays the tilt angle setting screen 500. The system control portion 223 displays, on the tilt control interface 505 of the tilt angle setting screen 500, an image expressing the axes of the tilt and the directions of the tilt that can be controlled and the current attitude of the image pickup element. In addition, the system control portion 223 displays the current value of the up/down tilt angle and the effective range of the up/down tilt angle in the up/down tilt control slider bar 506, and displays the current value of the left/right tilt angle and the effective range of the left/right tilt angle in the left/right tilt control slider bar 507. Then, the system control portion 223 displays the current value and the effective range of the up/down tilt angle in the display field 508, and displays the current value and the effective range of the left/right tilt angle in the display field 509.

Then, in Step S808, the system control portion 223 determines whether or not the tilt angles have been set. When the tilt angles are set through the tilt control interface 505, the up/down tilt control slider bar 506, and the left/right control slider bar 507, the system control portion 223 receives a setting instruction, and sets the tilt angles in accordance with the setting instruction. This processing is an example of tilt angle setting processing. When the tilt angles have been set (YES in Step S808), the system control portion 223 advances the processing to Step S809. When the tilt angles has not been set (NO in Step S808), the system control portion 223 advances the processing to Step S810. In Step S809, the system control portion 223 transmits the setting command for the tilt angles to the monitoring camera 100. The transmitted setting command for the tilt angles includes information on tilt, for example, the tilt axes, the tilt directions, and the set tilt angles.

Then, in Step S810, the system control portion 223 determines whether or not the "apply" button 510 on the tilt angle setting screen 500 is pressed, and the setting for the tilt angles is thus finished. When the setting of the tilt angles is finished (YES in Step S810), the system control portion 223 ends the setting processing. When the setting of the tilt angles is not finished (NO in Step S810), the system control portion 223 advances the processing to Step S803, and continues the processing.

As described above, when the tilt angles are to be set through the user operation, the control apparatus 110 first displays the zoom setting screen 300, to thereby execute the zoom setting in accordance with the user operation. The control apparatus 110 then displays the focus setting screen 400, to thereby execute the focus setting in accordance with the user operation. Then, after the zoom and the focus are set, the control apparatus 110 displays the tilt angle setting screen 500, to thereby set the tilt angles in accordance with the user operation under the state in which the zoom and the focus are set. The control apparatus 110 can control the order of settings in such a manner.

When the focus and the zoom are not fixed when the tilts are to be adjusted, optimal tilt angles cannot be set. In contrast, the control apparatus 110 according to the first embodiment sets the tilt angles after the setting of the field angle including at least the setting of the zoom and the setting of the focus are finished as described above. As a result, and advantageously, optimal tilt angles can be set under the state in which the focus and the zoom are set. In addition, the user can observe the enlarged display region 504 for displaying the region of interest specified in the image display region 501 in an enlarged manner on the tilt angle setting screen 500. Then, the user operates the three-dimensional model visually representing the state of the tilt angles of the image pickup element, to thereby be able to adjust the tilt angles through the tilt control interface 505 while confirming that the object appearing at a far position in a small size is focused. The user can easily set the tilt angles for extending the depth of field as described above. That is, the control apparatus 110 can appropriately set the tilt angles desired by the user without requiring complex operations. Moreover, the control apparatus 110 can smoothly set the parameters of the monitoring camera 100.

Moreover, for the tilt angles contained in the setting command transmitted to the monitoring camera 100, various expressions such as an angle value and a value normalized with respect to the effective range of the tilt angle can be used.

Second Embodiment

A description is now given mainly of different points of a monitoring system in a second embodiment of the present invention from the monitoring system in the first embodiment. In the monitoring system in the second embodiment, the control apparatus 110 displays, in the display portion 222, images picked up when the image pickup element is inclined in the respective directions about the controllable axes of the tilt. As a result, the user can intuitively understand in what amount to incline the image pickup element in order to extend the depth of field of the monitoring camera 100.

Figure 9:
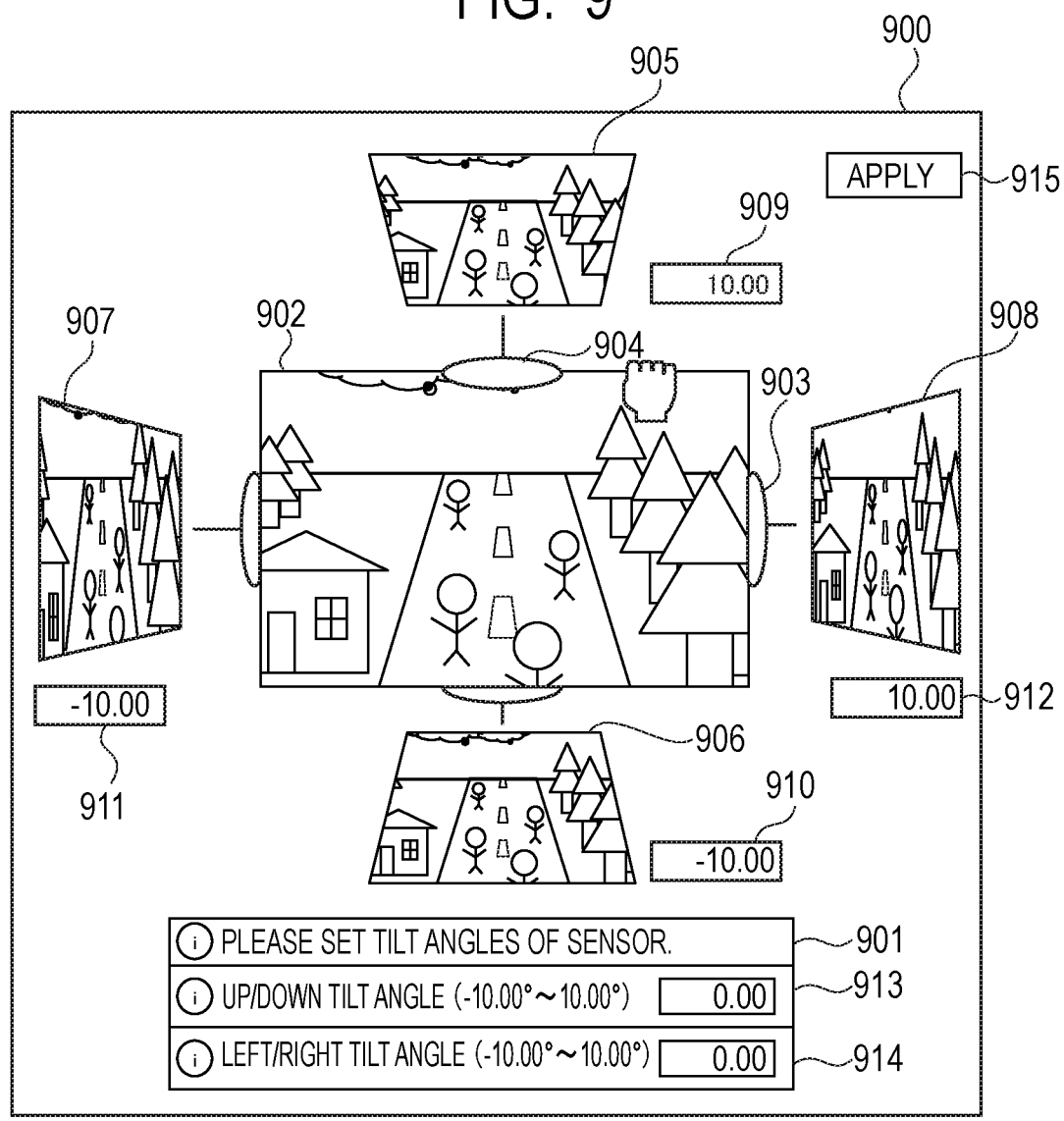
FIG. 9 is a view for illustrating an example of a tilt angle setting screen in a second embodiment of the present invention.

FIG. 9 is a view for illustrating an example of a tilt angle setting screen 900 in the second embodiment. A text display region 901 displays text. A tilt control interface 902 is used to control the tilt of the image pickup element. An up/down tilt axis 903 is used as an axis for the tilt of the image pickup element in the up/down directions. A left/right tilt axis 904 is used as an axis for the tilt of the image pickup element in the left/right direction. A display region 905 displays a picked-up image picked up when the image pickup element is maximally inclined toward the upward direction about the axis of the up/down tilt. A display region 906 displays a picked-up image picked up when the image pickup element is maximally inclined toward the downward direction about the axis of the up/down tilt. A display region 907 displays a picked-up image picked up when the image pickup element is maximally inclined toward the left direction about the axis of the left/right tilt. A display region 908 displays a picked-up image picked up when the image pickup element is maximally inclined toward the right direction about the axis of the left/right tilt. That is, a plurality of images corresponding to the respective tilt angles at the maximum inclinations are displayed in the regions 905, 906, 907, and 908.

A display field 909 displays the up/down tilt angle at the time when the picked-up image displayed in the region 905 is picked up. A display field 910 displays the up/down tilt angle at the time when the picked-up image displayed in the region 906 is picked up. A display field. 911 displays the left/right tilt angle at the time when the picked-up image displayed in the region 907 is picked up. A display field 912 displays the left/right tilt angle at the time when the picked-up image displayed in the region 908 is picked up. A display field 913 displays the current up/down tilt angle of the image pickup element. A display field. 914 displays the current left/right tilt angle of the image pickup element. An "apply" button 915 is used to finish the setting of the tilt.

In the text display region 901, the information for instructing the user to set the tilt angles, the information on the tilt containing the set values of the tilt angles and the tilt directions available for the setting, descriptions of the control interface and the images displayed on the tilt angle setting screen 900, and other such information are displayed. The tilt control interface 902 has a function of displaying the live image distributed from the monitoring camera 100. The user inclines the tilt control interface 902 toward any up/down and left/right directions about the up/down tilt axis 903 and the left/right tilt axis 904 as rotation axes, to thereby be able to adjust the tilt angles of the image pickup element of the monitoring camera 100.

On the tilt angle setting screen 900, the picked-up images picked up when the image pickup element is maximally inclined toward the respective directions are displayed in the display regions 905, 906, 907, and 908. The user sees the picked-up images displayed in those display regions to grasp the tilt axes and tilt directions of the image pickup element that enable an effect of extending the depth of field of the monitoring camera 100 to be provided. Then, the user drags the control interface 902 to incline the image pickup element toward the directions that enable the effect of extending the depth of field to be provided, to thereby adjust the image pickup element of the monitoring camera 100 to optimal tilt angles.

When the user operates the control interface 902, the control apparatus 110 transmits the setting command for the tilt angles to the monitoring camera 100 through the network 120. The effective ranges and the current values of the up/down tilt angle and the left/right tilt angle out of pieces of information on the tilt of the image pickup element received from the monitoring camera 100 are displayed in the display field 913 for the current up/down tilt angle of the image pickup element and the display field 914 for the current left/right tilt angle of the image pickup element. When the user presses the "apply" button 915, the control apparatus 110 ends the setting for the tilt.

Figure 10:
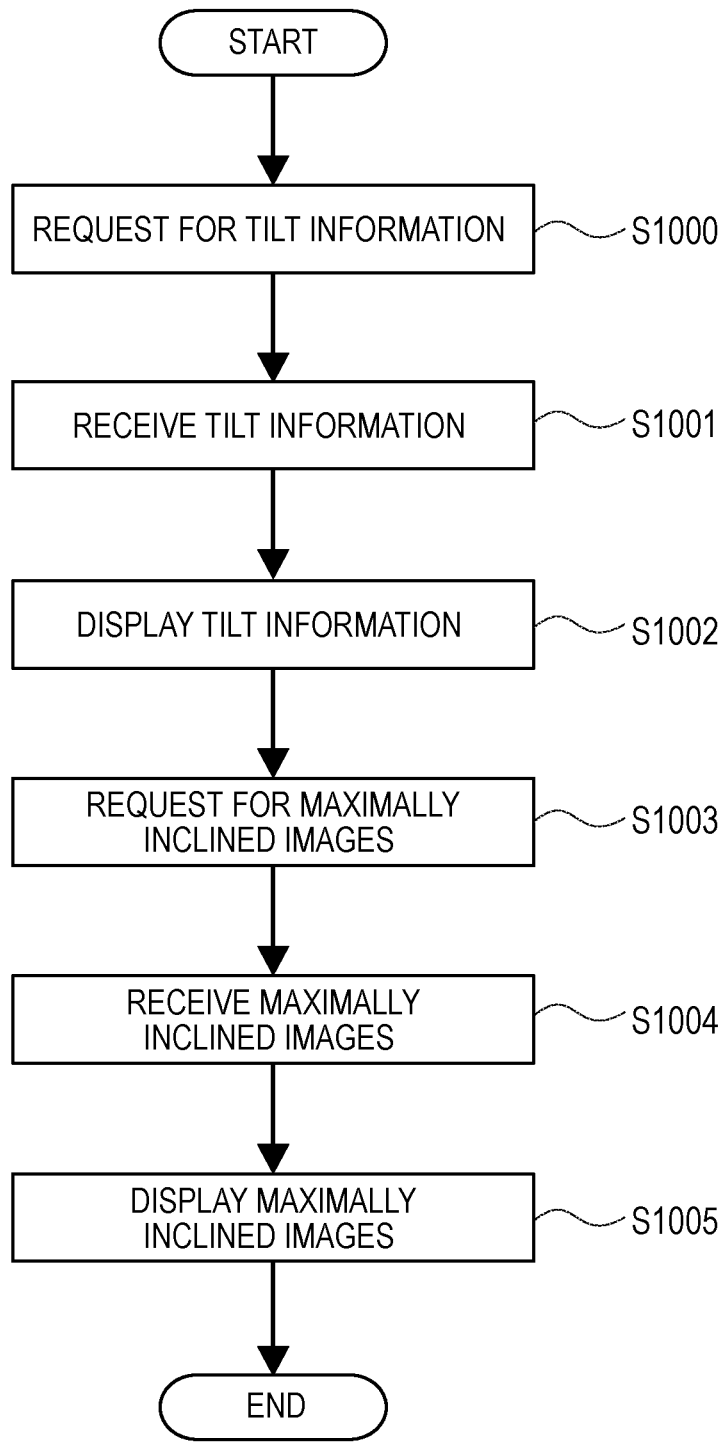
FIG. 10 is a flowchart for illustrating display processing for the tilt angle setting screen.

FIG. 10 is a flowchart for illustrating display processing for the tilt angle setting screen by the control apparatus 110 according to the second embodiment. This processing is processing to be executed in place of the processing in Step S806 and Step S807 described in the first embodiment. In Step S1000, the system control portion 223 requests for the tilt information from the monitoring camera 100. Then, in Step S1001, the system control portion 223 receives the tilt information from the monitoring camera 100. Then, in Step S1002, the system control portion 223 performs such control as to display the received tilt information. Specifically, the system control portion 223 displays the controllable tilt axes in the up/down tilt axis 903 and the left/right axis 904. Further, the system control portion 223 displays the maximum inclination angles at the time when the image pickup element is maximally inclined toward the respective controllable tilt directions in the display regions 909, 910, 911, and 912, and displays the current values of the tilt angles in the display fields 913 and 914.

Then, in Step S1003, the system control portion 223 requests for the maximally inclined images picked up when the image pickup element is maximally inclined toward the respective controllable tilt directions. Then, in Step S1004, the system control portion 223 receives the maximally inclined images. Then, in Step S1005, the system control portion 223 displays the respective received maximally inclined images in the display regions 905, 906, 907, and 908 in the tilt angle setting screen 900. The display processing is now ended.

As described above, in the second embodiment, the control apparatus 110 displays, in the tilt angle setting screen 900, the images picked up when the image pickup element is inclined toward the respective directions about the controllable tilt axes. Thus, the user can visually grasp the directions of the inclinations about the controllable tilt axes in order to extend the depth of field of the monitoring camera 100.

Figure 11:
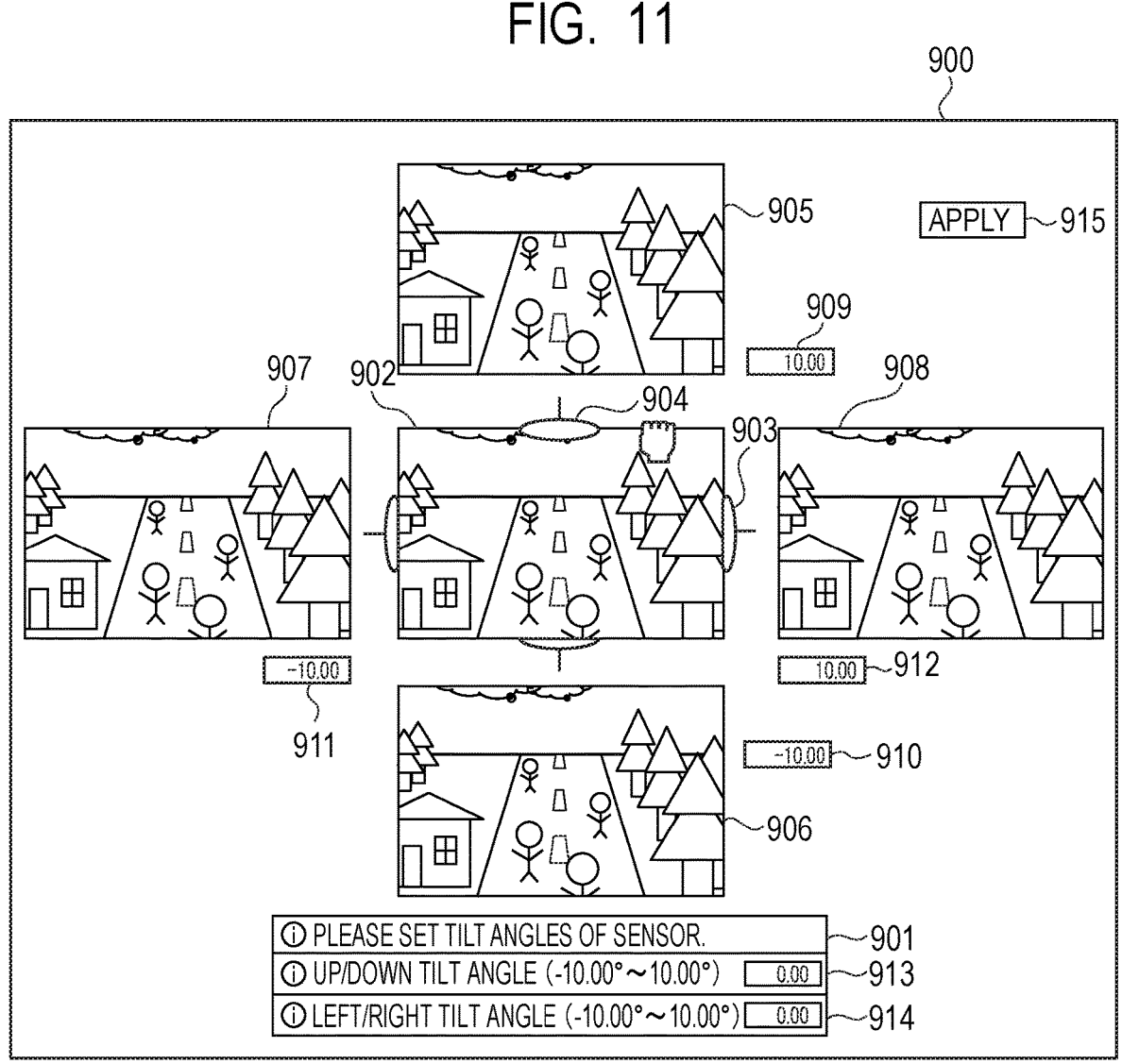
FIG. 11 is a view for illustrating an example of the tilt angle setting screen in the second embodiment.
Figure 12:
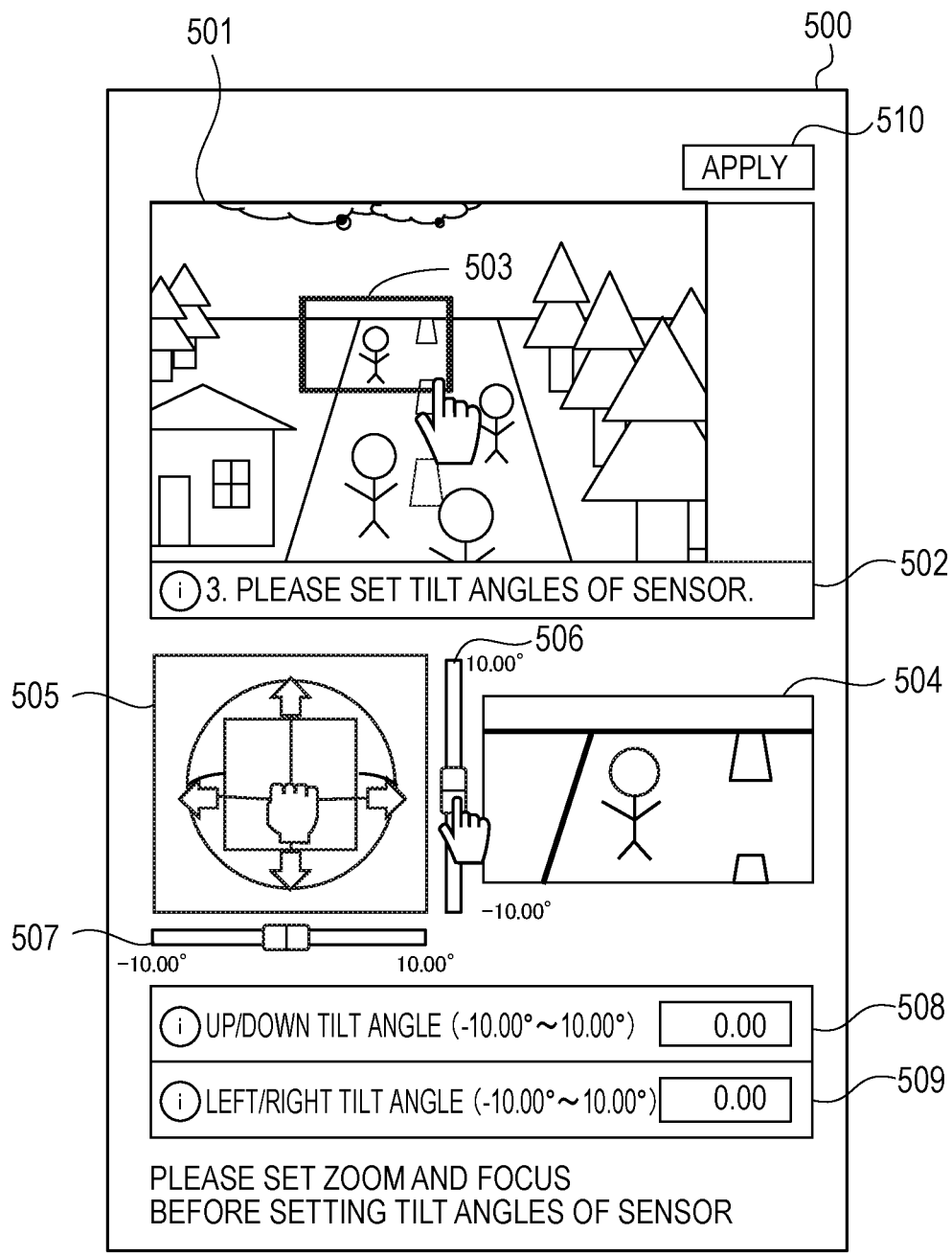
FIG. 12 is a view for illustrating an example of a tilt angle setting screen in a third embodiment of the present invention.

As a modification example of the second embodiment, the control apparatus 110 is only required to display a plurality of images picked up when the image pickup element is inclined toward a plurality of different directions. The display may take a form illustrated in FIG. 11. In the form illustrated in FIG. 11, the images displayed in the display regions 905, 906, 907, and 908 are displayed in the same direction as the direction of the image displayed in the tilt control interface 902.

Third Embodiment

A description is now given mainly of different points of a monitoring system in a third embodiment of the present invention from the monitoring system in the first embodiment. In the first embodiment, the display portion of the control apparatus 110 sequentially displays the screens 300, 400, and 500. Meanwhile, in the third embodiment, such a notification that the zoom and the focus are required to be set before the tilt angles are set is displayed on the tilt angle setting screen 500.

As described above, e.g. in the third embodiment, the tilt angles are not required to be adjusted again by prompting the user to set the zoom and the focus before the tilt angles are set, resulting in smooth setting of the parameters for the image pickup apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (WU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-092405, filed May 11, 2018, which is hereby incorporated by reference herein in its entirety.

What is claimed is:

1. A control apparatus for an image pickup apparatus, the image pickup apparatus including an image pickup element a tilt angle of which can be changed respect to an orthogonal plane orthogonal to an optical axis of an image pickup optical system and the control apparatus comprising::
   a control unit configured to:
      obtain information regarding an angle of view;
      obtain information regarding a focus value after the information regarding angle of view is obtained; and
      obtain information regarding a tilt angle of the image pickup element after the information regarding angle of view and the information regarding focus value are obtained; and
   a communication unit configured to send the information regarding angle of view, the information regarding focus value, and the information regarding tilt angle to the image pickup apparatus, wherein the tilt angle of the image pickup element is changed according to the information regarding tilt angle received from the control apparatus.

2. The control apparatus according to claim 1, further comprising:
   an acquisition unit configured to receive an image picked up by the image pickup apparatus; and
   a display processing unit configured to display the received image on a display screen,
   wherein the control unit is configured to obtain the information regarding tilt angle set in accordance with an input operation on the display screen.

3. The control apparatus according to claim 1, further comprising:
   an acquisition unit configured to receive an image picked up by the image pickup apparatus; and
   a display processing unit configured to display ,on the display screen, the received image and a setting image for setting the tilt angle.

4. The control apparatus according to claim 3, wherein the display processing unit is configured to display the setting image after the the information regarding angle of view and the information regarding focus value are obtained.

5. The control apparatus according to claim 2, wherein the display processing unit is configured to display a part of a region of the image in an enlarged manner.

6. The control apparatus according to claim 5, further comprising a region reception unit configured to receive a specification of the part of the region,
   wherein the display processing unit is configured to display, in an enlarged manner, a region specified through reception by the region reception unit.

7. The control apparatus according to claim 2,
   wherein the acquisition unit is configured to acquire a plurality of images respectively corresponding to a plurality of tilt angles different from one another, and
   wherein the display processing unit is configured to perform such control as to display the plurality of images.

8. The control apparatus according to claim 7, wherein the acquisition unit is configured to receive a plurality of images corresponding to respective tilt angles at a time of maximum inclinations respectively corresponding to a plurality of directions different from one another.

9. A control method to be executed by a control apparatus for an image pickup apparatus, the image pickup apparatus including an image pickup element a tilt angle of which can be changed respect to an orthogonal plane orthogonal to an optical axis of an image pickup optical system the control method comprising:
   obtaining information regarding an angle of view;
   sending the information regarding angle of view to the image pickup apparatus;
   obtaining information regarding a focus value after the information regarding angle of view is obtained;
   sending the information regarding focus value to the image pickup apparatus;
   obtaining information regarding a tilt angle of the image pickup element after the information regarding angle of view and the information regarding focus value are obtained; and
   sending the information regarding tilt angle to the image pickup apparatus, wherein the tilt angle of the image pickup element is changed according to the information regarding tilt angle received from the control apparatus.

10. A non-transitory storage medium having stored thereon a program for causing a computer to function as each of the units of a control apparatus for an image pickup apparatus, the image pickup apparatus including an image pickup element a tilt angle of which can be changed respect to an orthogonal plane orthogonal to an optical axis of an image pickup optical system and the control apparatus comprising:
  a control unit configured to:
    obtain information regarding an angle of view;
    obtain information regarding a focus value after the information regarding angle of view is obtained;
    obtain information regarding a tilt angle of the image pickup element after the information regarding angle of view and the information regarding focus value are obtained; and
  a communication unit configured to send the information regarding angle of view, the information regarding focus value, and the information regarding tilt angle to the image pickup apparatus, wherein the tilt angle of the image pickup element is changed according to the information regarding tilt angle received from the control apparatus.

* * * * *